(12) United States Patent
Choi et al.

(10) Patent No.: US 12,741,649 B2
(45) **Date of Patent: *Sep. 22, 2026**

(54) VEHICLE TOWING DRIVING CONTROL METHOD

(71) Applicants: Hyundai Motor Company, Seoul (KR); Kia Corporation, Seoul (KR)

(72) Inventors: Woul Sun Choi, Seoul (KR); Buhm Joo Suh, Seoul (KR); Yeong Il Choi, Seoul (KR); Seung Wook Lee, Seoul (KR); Seok Joon Kim, Seoul (KR); Tal Chol Kim, Seoul (KR); Hyuk Joon Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,861

(22) Filed: Sep. 17, 2024

(65) Prior Publication Data

US 2025/0010862 A1 Jan. 9, 2025

Related U.S. Application Data

(63) Continuation of application No. 18/227,227, filed on Jul. 27, 2023, now Pat. No. 12,122,387.

(30) Foreign Application Priority Data

Feb. 22, 2023 (KR) ........................ 10-2023-0023267

(51) Int. Cl.

*B60W 30/18* (2012.01)
*B60W 10/04* (2006.01)
*B60W 30/188* (2012.01)

(52) U.S. Cl.

CPC .......... *B60W 30/188* (2013.01); *B60W 10/04* (2013.01); *B60W 2510/18* (2013.01); *B60W 2520/266* (2013.01)

(58) Field of Classification Search

CPC ............... B60W 30/188; B60W 10/04; B60W 2510/18; B60W 2520/266;

(Continued)

(56) References Cited

U.S. PATENT DOCUMENTS

2008/0174174 A1* 7/2008 Burns ........................ B60L 7/14 303/152
2021/0245600 A1 8/2021 Imamura (Continued)

FOREIGN PATENT DOCUMENTS

DE 202018106548 U1 * 4/2020 ............. B62D 59/04
GB 2566492 A * 3/2019 ................ B60L 7/00

(Continued)

*Primary Examiner* — Tisha D Lewis
(74) *Attorney, Agent, or Firm* — MORGAN, LEWIS & BOCKIUS LLP

(57) ABSTRACT

When a towing vehicle is driven while towing a towed vehicle having driving force, a controller of the towed vehicle determines wheel slip of the towing vehicle based on driving information of the towing vehicle and determines wheel slip of the towed vehicle based on driving information of the towed vehicle, and upon determining that wheel slip of the towing vehicle or the towed vehicle has occurred or upon determining that wheel slip of each of the towing vehicle and the towed vehicle has occurred, control to increase or decrease driving force of the towed vehicle or control to change the driving force distribution ratio between left and right wheels of the towed vehicle is performed, whereby it is possible to improve driving stability and rough road escape performance of the towing vehicle and the towed vehicle.

1 Claim, 6 Drawing Sheets

(58) Field of Classification Search
CPC ......... B60W 2300/14; B60W 2556/65; B60W 10/18; B60W 30/02; B60W 30/18172; B60W 10/08; B60W 2520/26; B60W 2710/083; B60T 8/1701; B60T 8/176
See application file for complete search history.

(56) References Cited

U.S. PATENT DOCUMENTS

| | | | |
|---|---|---|---|
| 2023/0026988 | A1 | 1/2023 | Subramanian |
| 2024/0010186 | A1 | 1/2024 | Dhaens |

FOREIGN PATENT DOCUMENTS

| | | | |
|---|---|---|---|
| JP | 2018086927 | A | 6/2018 |
| SE | 2351095 | A1 | 10/2023 |

* cited by examiner

VEHICLE TOWING DRIVING CONTROL METHOD

CROSS-REFERENCE TO RELATED APPLICATION

The present application claims priority to Korean Patent Application No. 10-2023-0023267 filed on Feb. 22, 2023, the entire contents of which is incorporated herein for all purposes by this reference.

BACKGROUND OF THE PRESENT DISCLOSURE

Field of the Present Disclosure

The present disclosure relates to a vehicle towing driving control method, and more particularly to a vehicle towing driving control method capable of improving driving stability and rough road escape performance of a towing vehicle and a towed vehicle when the towing vehicle is driven while towing the towed vehicle.

Description of Related Art

In general, when it is necessary for an owner who possesses two vehicles having different purposes to use the two vehicles at a desired destination, one of the vehicles is designated as a towing vehicle while the other vehicle is designated as a towed vehicle, the towing vehicle is driven while towing the towed vehicle, whereby it is possible to move the two vehicles to the desired destination.

That is, one of the two vehicles is designated as a main vehicle that tows a towed vehicle, i.e., a towing vehicle, and the other vehicle is designated as a towed vehicle that is connected to the rear of the towing vehicle, whereby it is possible to move the two vehicles to the desired destination.

For example, the towing vehicle may be an internal combustion engine vehicle having high towing force due to increase in weight and aerodynamics of the towed vehicle, such as a sports utility vehicle (SUV) or a pickup truck, or an electrified vehicle, such as an electric vehicle, and the towed vehicle may be a camping trailer or a cargo trailer in most cases.

Because the towing vehicle is driven while towing the towed vehicle having no driving force, however, fuel efficiency of the towing vehicle is greatly reduced. Furthermore, when the towing vehicle is an electric vehicle, driving distance is reduced and performance of an electrified part, such as a motor, is lowered.

Also, if a wheel of the towing vehicle or the towed vehicle is located on a rough road (muddy road, puddle, or icy road) when the towing vehicle is driven while towing the towed vehicle having no driving force, escape from the rough road is impossible.

If a vehicle having no driving force is adopted as the towed vehicle, therefore, vehicle mobility and utility extension are limited.

Therefore, it is preferable for a vehicle having driving force to be adopted as a towed vehicle that is connected to a towing vehicle so that the towed vehicle as well as the towing vehicle may be driven depending on driving condition and road condition.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle towing driving control method configured so that when a towing vehicle is driven while towing a towed vehicle having driving force, a controller of the towed vehicle is configured to determine wheel slip of the towing vehicle based on various kinds of driving information of the towing vehicle and is configured to determine wheel slip of the towed vehicle based on various kinds of driving information of the towed vehicle, and upon determining that wheel slip of the towing vehicle or the towed vehicle has occurred or upon determining that both wheel slip of the towing vehicle and wheel sleep of the towed vehicle have occurred, control to increase or decrease driving force of the towed vehicle or control to change the driving force distribution ratio between left and right wheels of the towed vehicle is performed, whereby it is possible to improve driving stability and rough road escape performance of the towing vehicle and the towed vehicle.

The objects of the present disclosure are not limited to those described above, and other unmentioned objects of the present disclosure will be clearly understood by a person of ordinary skill in the art (hereinafter referred to as an "ordinary skilled person") from the following description.

aspects of the present disclosure are directed to providing a vehicle towing driving control method including performing communication for vehicle information transmission and reception between a first controller of a towing vehicle and a second controller of a towed vehicle, comparing, by the second controller, a slip ratio of a driving wheel of the towing vehicle with a reference slip ratio, determining, by the second controller, whether all driving wheels of the towing vehicle are in a slip state or some driving wheels of the towing vehicle are in a slip state, comparing, by the second controller, a slip ratio of a wheel of the towed vehicle with the reference slip ratio, and performing, by the second controller, control to increase left and right wheel driving forces of the towed vehicle when the slip ratio of the driving wheel of the towing vehicle is greater than the reference slip ratio, all of the driving wheels of the towing vehicle are in a slip state, and the slip ratio of the wheel of the towed vehicle is equal to or less than the reference slip ratio.

aspects of the present disclosure are directed to providing a vehicle towing driving control method including performing communication for vehicle information transmission and reception between a first controller of a towing vehicle and a second controller of a towed vehicle, comparing, by the second controller, a slip ratio of a driving wheel of the towing vehicle with a reference slip ratio, comparing, by the second controller, a slip ratio of a wheel of the towed vehicle with the reference slip ratio, determining, by the second controller, whether all wheels of the towed vehicle are in a slip state or predetermined wheels of the towed vehicle are in a slip state, and performing, by the second controller, control to limit left and right wheel driving forces of the towed vehicle when the slip ratio of the driving wheel of the towing vehicle is equal to or less than the reference slip ratio, the slip ratio of the wheel of the towed vehicle is greater than the reference slip ratio, and all or a predetermined number of the wheels of the towed vehicle are determined to be in a slip state.

aspects of the present disclosure are directed to providing a vehicle towing driving control method including performing communication for vehicle information transmission and reception between a first controller of a towing vehicle and a second controller of a towed vehicle, comparing, by the second controller, a slip ratio of a driving wheel of the towing vehicle with a reference slip ratio, determining, by the second controller, whether all driving wheels of the towing vehicle are in a slip state or some driving wheels of the towing vehicle are in a slip state, comparing, by the second controller, a slip ratio of a wheel of the towed vehicle with the reference slip ratio, determining, by the second controller, whether all wheels of the towed vehicle are in a slip state or predetermined wheels of the towed vehicle are in a slip state, and performing, by the second controller, control to limit left and right wheel driving forces of the towed vehicle first and then performing, by the second controller, control to increase the left and right wheel driving forces of the towed vehicle to solve slip of the towing vehicle when the slip ratio of the driving wheel of the towing vehicle is greater than the reference slip ratio, all of the driving wheels of the towing vehicle are in a slip state, the slip ratio of the wheel of the towed vehicle is greater than the reference slip ratio, and all or a predetermined number of the wheels of the towed vehicle are determined to be in a slip state.

aspects of the present disclosure are directed to providing a vehicle towing driving control method including performing communication for vehicle information transmission and reception between a first controller of a towing vehicle and a second controller of a towed vehicle, comparing, by the second controller, a slip ratio of a driving wheel of the towing vehicle with a reference slip ratio, determining, by the second controller, whether all driving wheels of the towing vehicle are in a slip state or some driving wheels of the towing vehicle are in a slip state, comparing, by the second controller, a slip ratio of a wheel of the towed vehicle with the reference slip ratio, determining, by the second controller, whether all wheels of the towed vehicle are in a slip state or predetermined wheels of the towed vehicle are in a slip state, and performing, by the second controller, control to limit left and right wheel driving forces of the towed vehicle first and then performing, by the second controller, control to increase the left wheel driving force or the right wheel driving force of the towed vehicle to solve slip of the towing vehicle when the slip ratio of the driving wheel of the towing vehicle is greater than the reference slip ratio, a predetermined number of the driving wheels of the towing vehicle are in a slip state, the slip ratio of the wheel of the towed vehicle is greater than the reference slip ratio, and all or a predetermined number of the wheels of the towed vehicle are determined to be in a slip state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

Figure 1:
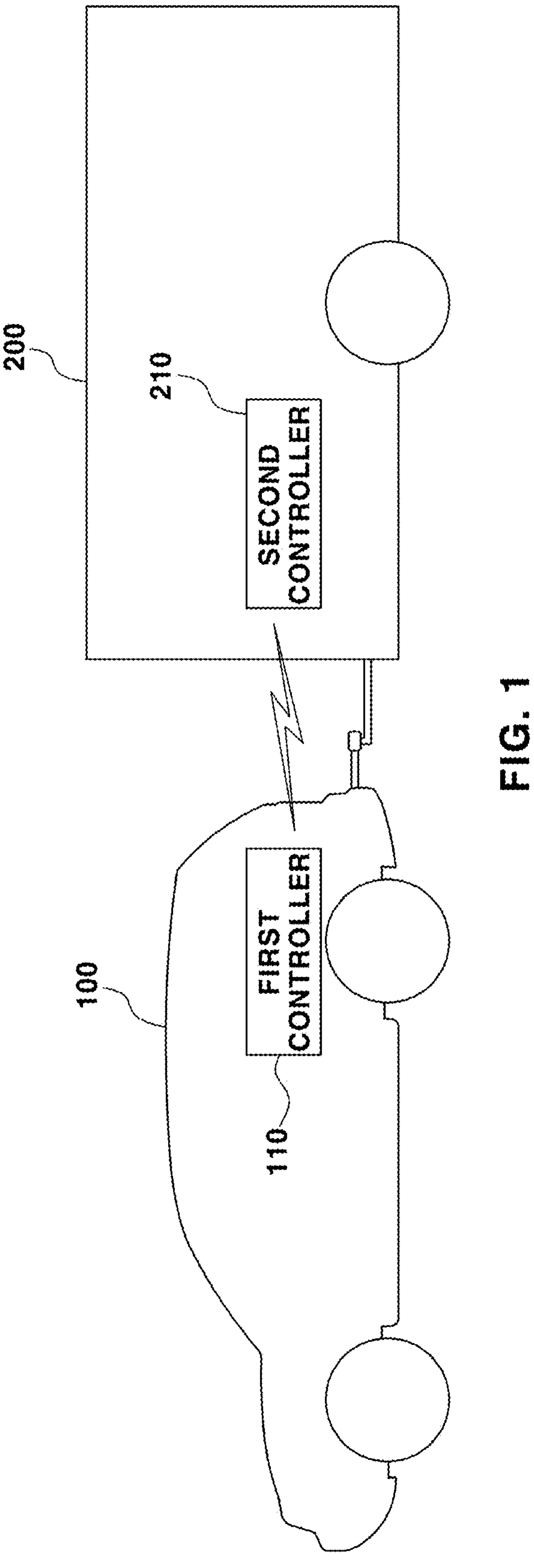
FIG. 1 is a schematic view showing an example in which a towing vehicle and a towed vehicle are communicatively connected to each other to perform a vehicle towing driving control method according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the exemplary embodiments of the present disclosure included in the present specification are provided only for illustrating embodiments of the present disclosure. Embodiments of the present disclosure may be implemented in various forms. Furthermore, the exemplary embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", may be interpreted in the same manner.

Wherever possible, the same reference numbers will be used throughout the drawings to refer to the same or like parts. The terms used in the present specification are provided only to explain specific embodiments, but are not intended to restrict the present disclosure. A singular representation may include a plural representation unless it represents a definitely different meaning from the context. It will be further understood that the terms "comprises", "comprising" and the like, when used in the present specification, specify the presence of stated components, steps, operations, and/or elements, but do not preclude the presence or addition of one or more other components, steps, operations, and/or elements.

Hereinafter, exemplary embodiments of the present disclosure will be described in detail with reference to the accompanying drawings.

To perform a vehicle towing driving control method according to an exemplary embodiment of the present disclosure, as shown in FIG. 1, a first controller 110 of a towing vehicle 100 and a second controller 210 of a towed vehicle 200 may be connected to each other to communicate with each other through Controller Area Network (CAN) communication to transmit and receive various vehicle signals, and may also be connected to each other to communicate with each other through other different wired and wireless communication devices.

The towing vehicle 100 may be an internal combustion engine vehicle or an electrified vehicle, such as an electric vehicle, and the towed vehicle 200 may be an electrified vehicle, such as an electric vehicle, or a vehicle provided with an electric vehicle (EV) drivetrain and a battery to have driving force.

The towed vehicle 200 may be a vehicle provided with an EV drivetrain and a battery to have driving force, wherein the EV drivetrain may be a combination of an in-wheel motor and a wheel, a combination of a motor of a driveshaft, or a combination of a motor, a reducer, and a driveshaft.

For example, the towed vehicle 200 may be implemented by a multi-platform vehicle (MPV) provided with an EV drivetrain and a battery to have driving force.

The multi-platform vehicle is a vehicle that includes an external shape like a camping trailer, is provided with a battery and an electric vehicle (EV) drivetrain including an in-wheel motor mounted to a left wheel and a right wheel, is provided with a battery and an EV drivetrain including a combination of a driveshaft configured to transmit power to a wheel and a driving motor connected to the driveshaft to transmit power thereto, or is provided with a battery and an EV drivetrain including a combination of a driveshaft configured to transmit power to a wheel and a reducer and a driving motor connected to the driveshaft to transmit power thereto, whereby motor driving and regenerative braking are possible.

Figure 2:
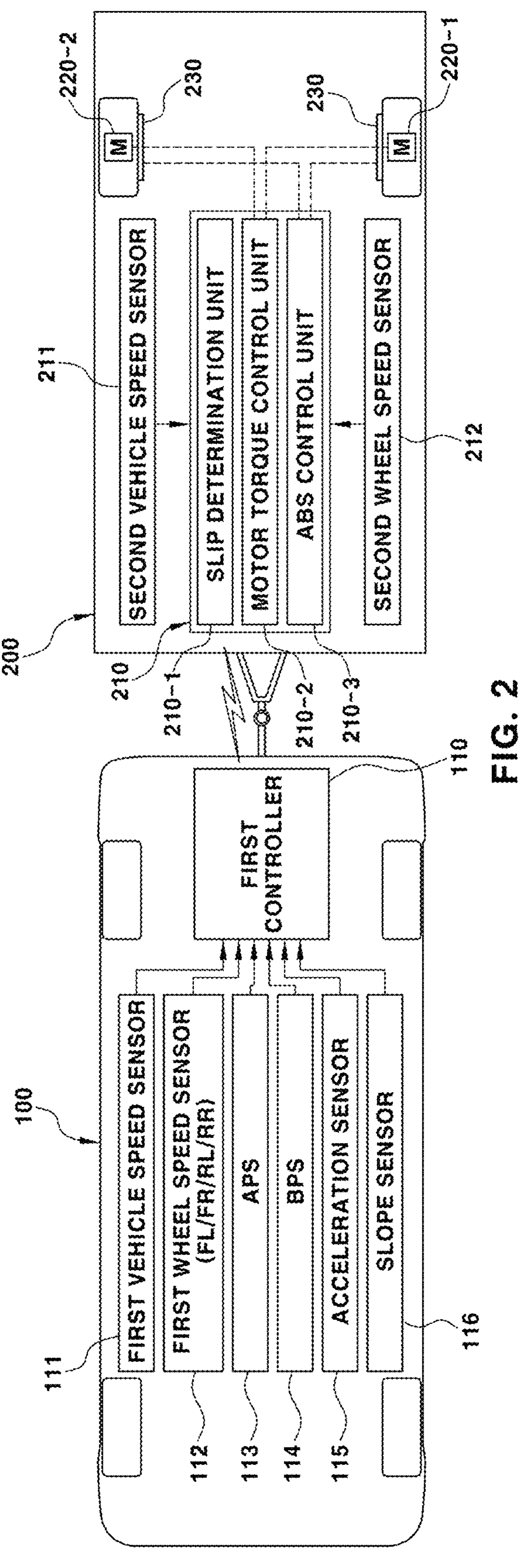
FIG. 2 is a control block diagram configured to perform the vehicle towing driving control method according to an exemplary embodiment of the present disclosure.

Referring to FIG. 2, a first vehicle speed sensor 111 configured to detect vehicle speed of the towing vehicle 100, a first wheel speed sensor 112 mounted to a front left wheel, a front right wheel, a rear left wheel, and a rear right wheel of the towing vehicle 100 to detect wheel speed, an accelerator position sensor (APS) 113 configured to detect an accelerator input value depending on the will of a driver of the towing vehicle 100, a brake pedal position sensor (BPS) 114 configured to detect a brake pedal input value depending on the will of the driver of the towing vehicle 100, an acceleration sensor 115 configured to detect acceleration of the towing vehicle 100, and a slope sensor 116 configured to detect a slope angle of a driving road on which the towing vehicle 100 is currently driven may be connected to the first controller 110 to transmit signals thereto.

When the towing vehicle 100 is driven while towing the towed vehicle 200, therefore, driving data of the towing vehicle, such as the vehicle speed detected by the first vehicle speed sensor 111, the wheel speed detected by the first wheel speed sensor 112, the accelerator input value detected by the APS 113, the brake pedal input value detected by the BPS 114, the acceleration detected by the acceleration sensor 115, and the driving road slope angle detected by the slope sensor 116, may be input to the first controller 110 of the towing vehicle 100, and may be transmitted to the second controller 210 of the towed vehicle 200 through CAN communication.

Referring to FIG. 2, a second vehicle speed sensor 211 configured to detect vehicle speed of the towed vehicle 200 and a second wheel speed sensor 212 mounted to a left wheel and a right wheel of the towed vehicle 200 to detect wheel speed may be connected to the second controller 210 to transmit signals thereto.

Furthermore, various sensor signals or a CAN signal may be provided to the first controller 110 and the second controller 210 to obtain additional vehicle information.

When the towing vehicle 100 is driven while towing the towed vehicle 200, therefore, driving data of the towed vehicle, such as the vehicle speed detected by the second vehicle speed sensor 211 and the wheel speed detected by the second wheel speed sensor 212, may be input to the second controller 210.

The second controller 210 may include a slip determination unit 210-1 configured to determine slip of the towing vehicle 100 and the towed vehicle 200 based on the driving data of the towing vehicle transmitted from the first controller 110 and the driving data of the towed vehicle input to the second controller 210, a motor torque control unit 210-2 configured to control increase or decrease of driving force (driving torque) of a first in-wheel motor 220-1 mounted to the left wheel of the towed vehicle 200 and a second in-wheel motor 220-2 mounted to the right wheel of the towed vehicle 200 and to control distribution of the driving force (driving torque), and an anti-lock braking system (ABS) control unit 210-3 configured to control braking force of a braking device 230 mounted to the left wheel and the right wheel of the towed vehicle 200.

Meanwhile, even when the EV drivetrain of the towed vehicle is not limited to the in-wheel motor and an EV drive train including a combination of one or more driving motors and a driveshaft is adopted or an EV drive train including a combination of one or more driving motors, a reducer, and a driveshaft is adopted, it is possible to simultaneously increase or decrease driving force of the left wheel and the right wheel of the towed vehicle to a predetermined level based on control of the motor torque of the towed vehicle by the motor torque control unit of the second controller.

Furthermore, even when the EV drivetrain of the towed vehicle is not limited to the in-wheel motor and an EV drive train including a combination of one or more driving motors and a driveshaft is adopted or an EV drive train including a combination of one or more driving motors, a reducer, and a driveshaft is adopted, it is possible to increase the driving force distribution ratio of the right wheel to the left wheel of the towed vehicle or to increase the driving force distribution ratio of the left wheel to the right wheel of the towed vehicle based on control of the motor torque of the towed vehicle by the motor torque control unit of the second controller.

Hereinafter, various embodiments of a vehicle towing driving control method according to an exemplary embodiment of the present disclosure based on the above control configuration will be sequentially described. For clear understanding of the present disclosure, a structure in which an in-wheel motor is mounted to left and right wheels will be described by way of example in the following embodiments.

First Exemplary Embodiments

Figure 3:
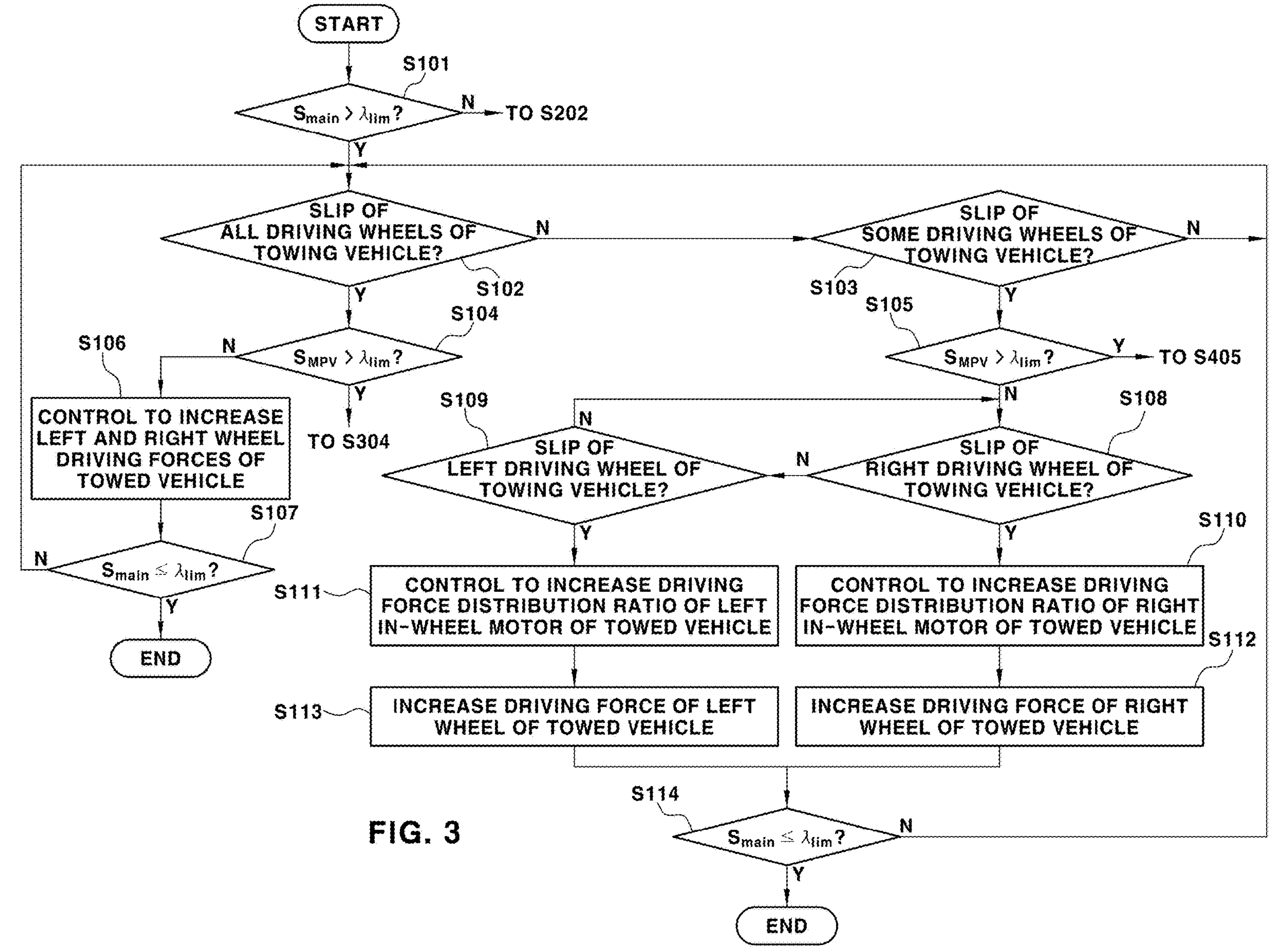
FIG. 3 is a flowchart showing a vehicle towing driving control method according to an exemplary embodiment of the present disclosure.

FIG. 3 is a flowchart showing a vehicle towing driving control method according to a first exemplary embodiments of the present disclosure.

The first exemplary embodiment of the present disclosure is characterized in that, if the wheel of the towed vehicle 200 does not slip and only the driving wheel of the towing vehicle 100 slips when the towing vehicle 100 is driven while towing the towed vehicle 200 having driving force in the state in which the first controller 110 of the towing vehicle 100 and the second controller 210 of the towed vehicle 200 are communicatively connected to each other for driving data transmission, control is performed to increase driving force of the towed vehicle or control is performed to change the driving force distribution ratio between the left and right wheels of the towed vehicle, whereby the towing vehicle easily escapes a rough road causing slip, and therefore driving stability is secured.

To the present end, when the towing vehicle 100 is driven while towing the towed vehicle 200, first, the second controller 210 is configured to determine a slip ratio $S_{main}$ of the driving wheel of the towing vehicle 100 and compares the determined slip ratio with a reference slip ratio $\lambda_{lim}$ (S101).

For example, the slip determination unit 210-1 of the second controller 210 may be configured to determine the slip ratio $S_{main}$ of the driving wheel of the towing vehicle 100 using Mathematical Expression 1 below based on the vehicle speed detected by the first vehicle speed sensor 111 and the wheel speed detected by the first wheel speed sensor 112, received from the first controller 110 through CAN communication.

$$S_{main} = \frac{v_w - v_{main}}{v_{main}} \quad \text{[Mathematical Expression 1]}$$

In Mathematical Expression 1 above, $V_W$ indicates wheel speed of the driving wheel of the towing vehicle, and $V_{main}$ indicates vehicle speed of the towing vehicle.

The reference slip ratio $\lambda_{lim}$ is the maximum slip ratio at which the driving behavior of the towing vehicle or the towed vehicle is normal, which is a predetermined value.

When the slip ratio $S_{main}$ of the driving wheel of the towing vehicle 100 is greater than the reference slip ratio $\lambda_{lim}$ as the result of comparison in step S101, it may be determined that the driving behavior of the towing vehicle is unstable.

Subsequently, the second controller 210 is configured to determine whether all of the driving wheels of the towing vehicle are in a slip state (S102) or is configured to determine whether some of the driving wheels of the towing vehicle are in a slip state (S103).

For example, when both wheel speed $V_{W\_L}$ of the left driving wheel of the towing vehicle and wheel speed $V_{W\_R}$ of the right driving wheel of the towing vehicle are greater than the product of the vehicle speed $V_{main}$ of the towing vehicle and (1+ reference slip ratio $\lambda_{lim}$), as represented by Mathematical Expression 2 below, based on the vehicle speed detected by the first vehicle speed sensor 111 and the wheel speed detected by the first wheel speed sensor 112, received from the first controller 110 through CAN communication, the slip determination unit 210-1 of the second controller 210 may be configured to determine that all of the driving wheels of the towing vehicle are in a slip state.

$$v_{w\_L} > v_{main}(1+\lambda_{lim}) \,\&\, v_{w\_R} > v_{main}(1+\lambda_{lim}) \quad \text{[Mathematical Expression 2]}$$

In contrast, when the wheel speed $V_{W\_L}$ of the left driving wheel of the towing vehicle or wheel speed $V_{W\_R}$ of the right driving wheel of the towing vehicle is greater than the product of the vehicle speed $V_{main}$ of the towing vehicle and (1+ reference slip ratio $\lambda_{lim}$), as represented by Mathematical Expression 3 below, based on the vehicle speed detected by the first vehicle speed sensor 111 and the wheel speed detected by the first wheel speed sensor 112, received from the first controller 110 through CAN communication, the slip determination unit 210-1 of the second controller 210 may be configured to determine that some of the driving wheels of the towing vehicle are in a slip state.

$$v_{w\_L} > v_{main}(1+\lambda_{lim}) \text{ or } v_{w\_R} > v_{main}(1+\lambda_{lim}) \quad \text{[Mathematical Expression 3]}$$

Upon determining that all of the driving wheels of the towing vehicle are in a slip state, the second controller 210 is configured to determine a slip ratio $S_{MPV}$ of the wheel of the towed vehicle 200 and compares the determined slip ratio with the reference slip ratio $\lambda_{lim}$ (S104). Even when some of the driving wheels of the towing vehicle are determined to be in a slip state, the second controller 210 is configured to determine the slip ratio $S_{MPV}$ of the wheel of the towed vehicle 200 and compares the determined slip ratio with the reference slip ratio $\lambda_{lim}$ (S105).

For example, the slip determination unit 210-1 of the second controller 210 may be configured to determine the slip ratio $S_{MPV}$ of the wheel of the towed vehicle 200 using Mathematical Expression 4 below based on the vehicle speed detected by the second vehicle speed sensor 211 and the wheel speed detected by the second wheel speed sensor 212.

$$S_{MPV} = \frac{v_w - v_{MPV}}{v_{MPV}} \quad \text{[Mathematical Expression 4]}$$

In Mathematical Expression 4 above, $V_W$ indicates wheel speed of the wheel of the towed vehicle, and $V_{MPV}$ indicates vehicle speed of the towed vehicle.

When the slip ratio $S_{MPV}$ of the wheel of the towed vehicle 200 is less than the reference slip ratio $\lambda_{lim}$ as the result of comparison in step S104, the second controller 210 finally is configured to determine that the wheel of the towed vehicle is not in a slip state and all of the driving wheels (left and right driving wheels) of the towing vehicle are in a slip state, and is configured to perform control so that driving force of the towed vehicle is increased to solve the slip state of all of the driving wheels of the towing vehicle.

Control to increase driving force of the towed vehicle to solve the slip state of all of the driving wheels of the towing vehicle is implemented by control to increase driving force of the left and right wheels of the towed vehicle (S106).

For example, the motor torque control unit 210-2 of the second controller 210 may perform control so that driving force (driving torque) of the left in-wheel motor 220-1 mounted to the left wheel of the towed vehicle 200 and driving force (driving torque) of the right in-wheel motor 220-2 mounted to the right wheel of the towed vehicle 200 are simultaneously increased to a predetermined level, whereby both left and right wheel driving forces of the towed vehicle may be increased.

At the present time, left and right wheel driving forces $T_{MPV\_NEW}$ of the towed vehicle increased to the predetermined level may be determined as the product of driving force $T_{MPV\_ORIGIN}$ of the towed vehicle before increase, the slip ratio $S_{main}$ of the driving wheel of the towing vehicle 100, and a factor determined as vehicle speed $V_{main}$ of the towing vehicle, as represented by Mathematical Expression 5 below.

$$T_{MPV\_NEW} = T_{MPV\_ORIGIN} \times S_{main} \times \text{factor}(v_{main}) \quad \text{[Mathematical Expression 5]}$$

When all of the driving wheels (left and right driving wheels) of the towing vehicle slip, therefore, control may be performed to increase both left and right wheel driving forces of the towed vehicle, whereby the towing vehicle may easily escape a rough road causing slip by the increased wheel driving force of the towed vehicle, and therefore driving stability of the towing vehicle may be secured again.

Meanwhile, after control is performed to increase left and right wheel driving forces of the towed vehicle in step S106, the second controller 210 compares the slip ratio $S_{main}$ of the driving wheel of the towing vehicle 100 with the reference slip ratio $\lambda_{lim}$(S107). When the slip ratio $S_{main}$ of the driving wheel of the towing vehicle 100 is less than the reference slip ratio $\lambda_{lim}$, the second controller 210 is configured to determine that the slip state of the towing vehicle has been solved and terminates control to solve slip of the towing vehicle and to escape the rough road.

When the slip ratio $S_{MPV}$ of the wheel of the towed vehicle 200 is less than the reference slip ratio $\lambda_{lim}$ as the result of comparison in step S105, the second controller 210 is configured to determine that the wheel of the towed vehicle is not in a slip state and some of the driving wheels (left or right driving wheel) of the towing vehicle are in a slip state, and is configured to perform control to distribute left and right wheel driving forces of the towed vehicle.

Subsequently, the second controller 210 is configured to determine whether the right driving wheel of the towing vehicle is in a slip state (S108) or is configured to determine whether the left driving wheel of the towing vehicle is in a slip state (S109) as a preceding step of performing control to distribute left and right wheel driving forces of the towed vehicle.

For example, when wheel speed $V_{W\_R}$ of the right driving wheel of the towing vehicle is greater than the product of the vehicle speed $V_{main}$ of the towing vehicle and (1+ reference slip ratio $\lambda_{lim}$), it may be determined that the right driving wheel of the towing vehicle is in a slip state. In contrast, when wheel speed $V_{W\_L}$ of the left driving wheel of the towing vehicle is greater than the product of the vehicle speed $V_{main}$ of the towing vehicle and (1+ reference slip ratio $\lambda_{lim}$), as described above, it may be determined that the left driving wheel of the towing vehicle is in a slip state.

Upon determining in step S108 that the right driving wheel of the towing vehicle is in a slip state, the second controller 210 is configured to perform control to increase the driving force distribution ratio of the right in-wheel motor 220-2 of the towed vehicle (Silo).

At the present time, the increased driving force distribution ratio $D_{NEW}$ of the right in-wheel motor 220-2 may be determined by multiplying the previous driving force distribution ratio $D_{ORIGIN}$ by the difference in absolute value between wheel speed $V_{W\_L}$ of the left driving wheel of the towing vehicle and wheel speed $V_{W\_R}$ of the right driving wheel of the towing vehicle, as represented by Mathematical Expression 6 below.

$$D_{NEW} = D_{ORIGIN} \times \text{factor}(|v_{w\_left} - v_{w\_right}|) \quad \text{[Mathematical Expression 6]}$$

The second controller 210 is configured to perform control to increase the driving force distribution ratio of the right in-wheel motor 220-2 of the towed vehicle, and the motor torque control unit 210-2 of the second controller 210 is configured to control torque of the right in-wheel motor 220-2 based on the increased driving force distribution ratio, whereby driving force of the right wheel of the towed vehicle may become higher than driving force of the left wheel of the towed vehicle (S112).

When the right driving wheel of the towing vehicle is in a slip state, therefore, the towing vehicle may easily escape a rough road causing slip by the increased right wheel driving force of the towed vehicle, whereby driving stability of the towing vehicle may be secured again.

In contrast, upon determining in step S109 that the left driving wheel of the towing vehicle is in a slip state, the second controller 210 is configured to perform control to increase the driving force distribution ratio of the left in-wheel motor 220-1 of the towed vehicle (S110).

In the same manner, the increased driving force distribution ratio $D_{NEW}$ of the left in-wheel motor 220-1 may be determined by multiplying the previous driving force distribution ratio $D_{ORIGIN}$ by the difference in absolute value between wheel speed $V_{W\_L}$ of the left driving wheel of the towing vehicle and wheel speed $V_{W\_R}$ of the right driving wheel of the towing vehicle, as represented by Mathematical Expression 6 above.

The second controller 210 is configured to perform control to increase the driving force distribution ratio of the left in-wheel motor 220-1 of the towed vehicle, and the motor torque control unit 210-2 of the second controller 210 is configured to control torque of the left in-wheel motor 220-1 based on the increased driving force distribution ratio, whereby driving force of the left wheel of the towed vehicle may become higher than driving force of the right wheel of the towed vehicle (S113).

When the left driving wheel of the towing vehicle is in a slip state, therefore, the towing vehicle may easily escape a rough road causing slip by the increased left wheel driving force of the towed vehicle, whereby driving stability of the towing vehicle may be secured again.

Meanwhile, after steps S112 and S113 are performed, the second controller 210 compares the slip ratio $S_{main}$ of the driving wheel of the towing vehicle 100 with the reference slip ratio $\lambda_{lim}$ again (S114). When the slip ratio $S_{main}$ of the driving wheel of the towing vehicle 100 is less than the reference slip ratio $\lambda_{lim}$, the second controller 210 is configured to determine that the slip state of the towing vehicle has been solved and terminates control to solve slip of the towing vehicle and to escape the rough road.

Second Exemplary Embodiments

Figure 4:
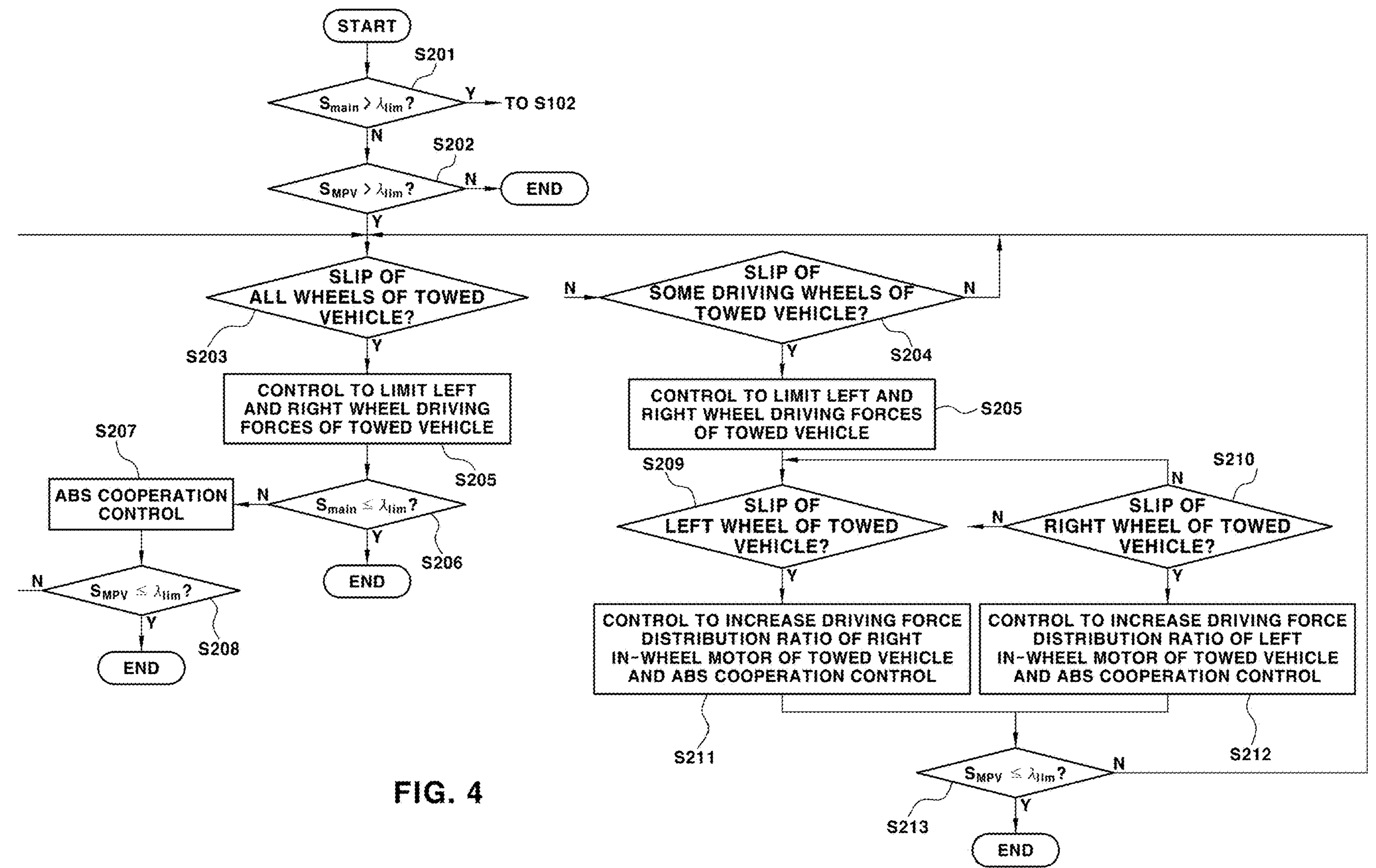
FIG. 4 is a flowchart showing a vehicle towing driving control method according to an exemplary embodiment of the present disclosure.

FIG. 4 is a flowchart showing a vehicle towing driving control method according to a second exemplary embodiments of the present disclosure.

The second exemplary embodiments of the present disclosure is characterized in that, when the driving wheel of the towing vehicle 100 does not slip and only the wheel of the towed vehicle 200 slips when the towing vehicle 100 is driven while towing the towed vehicle 200 having driving force in the state in which the first controller 110 of the towing vehicle 100 and the second controller 210 of the towed vehicle 200 are communicatively connected to each other for driving data transmission, control is performed to limit (decrease) driving force of the towed vehicle or control is performed to change the driving force distribution ratio between the left and right wheels of the towed vehicle, whereby the towed vehicle easily escapes a rough road causing slip, and therefore driving stability is secured.

To the present end, when the towing vehicle 100 is driven while towing the towed vehicle 200, first, the second controller 210 is configured to determine the slip ratio $S_{main}$ of the driving wheel of the towing vehicle 100 and compares the determined slip ratio with the reference slip ratio $\lambda_{lim}$ (S201).

When the slip ratio $S_{main}$ of the driving wheel of the towing vehicle 100 is less than the reference slip ratio $\lambda_{lim}$ as the result of comparison in step S201, the second controller 210 is configured to determine the slip ratio $S_{MPV}$ of the wheel of the towed vehicle 200 and compares the determined slip ratio with the reference slip ratio $\lambda_{lim}$(S202).

At the present time, the slip ratio $S_{main}$ of the driving wheel of the towing vehicle 100 may be determined using Mathematical Expression 1 above, and the slip ratio $S_{MPV}$ of the wheel of the towed vehicle 200 may be determined using Mathematical Expression 4 above.

When the slip ratio $S_{MPV}$ of the wheel of the towed vehicle 200 is greater than the reference slip ratio $\lambda_{lim}$ as the result of comparison in step S202, the second controller 210 may be configured to determine that the driving wheel of the towing vehicle does not slip and only the wheel of the towed vehicle slips.

Subsequently, the second controller 210 is configured to determine whether all of the driving wheels of the towed vehicle are in a slip state (S203) or is configured to determine whether some of the driving wheels of the towed vehicle are in a slip state (S204).

For example, when both wheel speed $V_{W\_L}$ of the left wheel of the towed vehicle and wheel speed $V_{W\_R}$ of the right wheel of the towed vehicle are greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that all of the driving wheels of the towed vehicle are in a slip state.

In contrast, when wheel speed $V_{W\_L}$ of the left wheel of the towed vehicle or wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that some of the driving wheels of the towed vehicle are in a slip state.

Subsequently, upon determining in step S203 that all of the driving wheels of the towed vehicle are in a slip state or upon determining in step S204 that some of the driving wheels of the towed vehicle are in a slip state, control is performed to limit left and right wheel driving forces of the towed vehicle to primarily avoid slip of the towed vehicle (S205).

Control to limit left and right wheel driving forces of the towed vehicle may be implemented by control to decrease left and right wheel driving forces of the towed vehicle to primarily solve slip of all or some of the driving wheels of the towed vehicle.

For example, the motor torque control unit 210-2 of the second controller 210 may perform control so that driving force (driving torque) of the left in-wheel motor 220-1 mounted to the left wheel of the towed vehicle 200 and driving force (driving torque) of the right in-wheel motor 220-2 mounted to the right wheel of the towed vehicle 200 are simultaneously decreased to a predetermined level, whereby both left and right wheel driving forces of the towed vehicle may be decreased.

At the present time, decreased values $T_{MPV\_NEW}$ of left and right wheel driving forces of the towed vehicle may be determined as the product of driving force $T_{MPV\_ORIGIN}$ of the towed vehicle before decrease, a first factor factor1 determined as vehicle speed $V_{main}$ of the towing vehicle 100, and a second factor factor2 determined as the slip ratio $S_{main}$ of the driving wheel of the towing vehicle 100, as represented by Mathematical Expression 7 below.

[Mathematical Expression 7]

$$D_{NEW} = D_{ORIGIN} \times \text{factor1}(v_{MPV}) \times \text{factor2}(S_{main})$$

When all of the wheels (left and right wheels) of the towed vehicle slip, therefore, control may be performed to decrease both left and right wheel driving forces of the towed vehicle, whereby the towed vehicle may easily escape a rough road causing slip by the decreased wheel driving force of the towed vehicle, and therefore driving stability of the towed vehicle may be secured again.

Meanwhile, after control is performed to limit left and right wheel driving forces of the towed vehicle, i.e., to decrease left and right wheel driving forces of the towed vehicle, in step S205 after all of the driving wheels of the towed vehicle are determined to be in a slip state, the second controller 210 compares the slip ratio $S_{MPV}$ of the wheel of the towed vehicle 200 with the reference slip ratio $\lambda_{lim}$ (S206). When the slip ratio $S_{MPV}$ of the wheel of the towed vehicle 200 is equal to or less than the reference slip ratio $\lambda_{lim}$, the second controller 210 is configured to determine that the slip state of the towed vehicle has been solved and terminates control to solve slip of the towed vehicle and to escape the rough road.

When the slip ratio $S_{MPV}$ of the wheel of the towed vehicle 200 is continuously greater than the reference slip ratio $\lambda_{lim}$ as the result of comparison in step S206, ABS cooperation control may be performed (S207).

ABS cooperation control may be performed as the result of the ABS control unit 210-3 of the second controller 210 applying braking force to the braking device 230 mounted to the left wheel and the right wheel of the towed vehicle 200 at a predetermined cycle.

Consequently, the left and right wheel driving forces of the towed vehicle are further limited through ABS cooperation control in addition to decrease of wheel driving force of the towed vehicle, whereby the towed vehicle may easily escape a rough road causing slip, and therefore driving stability of the towed vehicle may be easily secured.

Meanwhile, after left and right wheel driving forces of the towed vehicle are further limited through ABS cooperation control in addition to decrease of wheel driving force of the towed vehicle, the second controller 210 compares the slip ratio $S_{MPV}$ of the wheel of the towed vehicle 200 with the reference slip ratio $\lambda_{lim}$ again (S208). When the slip ratio $S_{MPV}$ of the wheel of the towed vehicle 200 is equal to or less than the reference slip ratio $\lambda_{lim}$, the second controller 210 is configured to determine that the slip state of the towed vehicle has been solved and terminates control to solve slip of the towed vehicle and to escape the rough road.

After some of the driving wheels of the towed vehicle are determined to be in a slip state in step S204 and control to limit left and right wheel driving forces of the towed vehicle, i.e., to decrease left and right wheel driving forces of the towed vehicle, is performed in step S205, the second controller 210 is configured to determine whether the left wheel of the towed vehicle is in a slip state (S209) or is configured to determine whether the right driving wheel of the towing vehicle is in a slip state (S210).

For example, when wheel speed $V_{W\_L}$ of the left wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the left wheel of the towed vehicle is in a slip state.

In contrast, when wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the right wheel of the towed vehicle is in a slip state.

Upon determining in step S209 that the left wheel of the towed vehicle is in a slip state, the second controller 210 is configured to perform control to increase the driving force distribution ratio of the right in-wheel motor 220-2 of the towed vehicle to be greater than the driving force distribution ratio of the left in-wheel motor 220-1 of the towed vehicle and ABS cooperation control (S211).

At the present time, the increased driving force distribution ratio $D_{NEW}$ of the right in-wheel motor 220-2 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the left wheel of the towed vehicle 200, which is in a slip state, at a predetermined cycle.

When the left wheel of the towed vehicle is in a slip state, therefore, control to increase the driving force distribution ratio of the right wheel to be greater than the driving force distribution ratio of the left wheel is performed, and at the same time ABS cooperation control is performed for the left wheel, whereby the towed vehicle may easily escape a rough road causing slip, and therefore driving stability of the towed vehicle may be easily secured.

In contrast, upon determining in step S210 that the right wheel of the towed vehicle is in a slip state, the second controller 210 is configured to perform control to increase the driving force distribution ratio of the left in-wheel motor 220-1 of the towed vehicle to be greater than the driving force distribution ratio of the right in-wheel motor 220-2 of the towed vehicle and ABS cooperation control (S212).

In the same manner, the increased driving force distribution ratio $D_{NEW}$ of the left in-wheel motor 220-1 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the right wheel of the towed vehicle 200, which is in a slip state, at a predetermined cycle.

When the right wheel of the towed vehicle is in a slip state, therefore, control to increase the driving force distribution ratio of the left wheel to be greater than the driving force distribution ratio of the right wheel is performed, and at the same time ABS cooperation control is performed for the right wheel, whereby the towed vehicle may easily escape a rough road causing slip, and therefore driving stability of the towed vehicle may be easily secured.

Meanwhile, after steps S211 and S212 are performed, the second controller 210 compares the slip ratio $S_{MPV}$ of the wheel of the towed vehicle 200 with the reference slip ratio $\lambda_{lim}$ again (S213). When the slip ratio $S_{MPV}$ of the wheel of the towed vehicle 200 is equal to or less than the reference slip ratio $\lambda_{lim}$, the second controller 210 is configured to determine that the slip state of the towed vehicle has been solved and terminates control to solve slip of the towed vehicle and to escape the rough road.

Third Exemplary Embodiments

Figure 5:
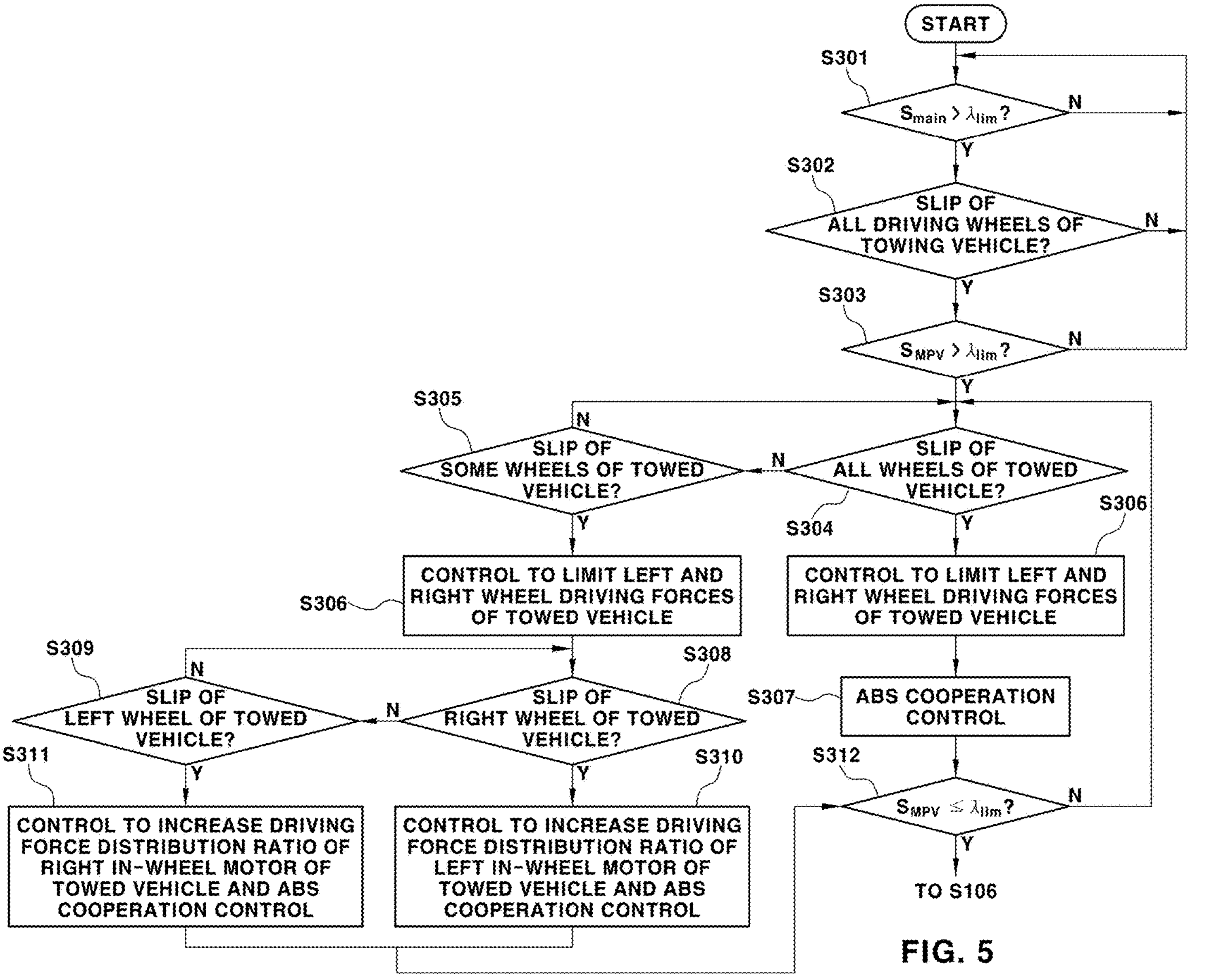
FIG. 5 is a flowchart showing a vehicle towing driving control method according to an exemplary embodiment of the present disclosure.

FIG. 5 is a flowchart showing a vehicle towing driving control method according to a third exemplary embodiments of the present disclosure.

The third exemplary embodiment of the present disclosure is characterized in that, if all of the driving wheels of the towing vehicle 100 are in a slip state and all or some of the driving wheels of the towed vehicle 200 are in a slip state when the towing vehicle 100 is driven while towing the towed vehicle 200 having driving force in the state in which the first controller 110 of the towing vehicle 100 and the second controller 210 of the towed vehicle 200 are communicatively connected to each other for driving data transmission, both the towing vehicle and the towed vehicle easily escape a rough road causing slip, and therefore driving stability is secured.

In other words, the third exemplary embodiment of the present disclosure is characterized in that, if all of the driving wheels of the towing vehicle 100 are in a slip state and all or some of the driving wheels of the towed vehicle 200 are in a slip state when the towing vehicle 100 is driven while towing the towed vehicle 200, control to solve slip of the towed vehicle and to escape the rough road is performed first to secure driving stability of the towed vehicle, and then control to solve slip of the towing vehicle and to escape the rough road is performed to secure driving stability of the towing vehicle.

To the present end, when the towing vehicle 100 is driven while towing the towed vehicle 200, first, the second controller 210 is configured to determine the slip ratio $S_{main}$ of the driving wheel of the towing vehicle 100 and compares the determined slip ratio with the reference slip ratio $\lambda_{lim}$ (S301), is configured to determine whether all of the driving wheels of the towing vehicle are in a slip state (S302), and is configured to determine the slip ratio $S_{MPV}$ of the wheel of the towed vehicle 200 and compares the determined slip ratio with the reference slip ratio $\lambda_{lim}$ (S303).

For example, when both wheel speed $V_{W\_L}$ of the left driving wheel of the towing vehicle and wheel speed $V_{W\_R}$ of the right driving wheel of the towing vehicle are greater than the product of the vehicle speed $V_{main}$ of the towing vehicle and (1+ reference slip ratio $\lambda_{lim}$), as represented by Mathematical Expression 2 above, based on the vehicle speed detected by the first vehicle speed sensor 111 and the wheel speed detected by the first wheel speed sensor 112, received from the first controller 110 through CAN communication, the slip determination unit 210-1 of the second controller 210 may determine that all of the driving wheels of the towing vehicle are in a slip state.

When the slip ratio $S_{main}$ of the driving wheel of the towing vehicle 100 is greater than the reference slip ratio $\lambda_{lim}$ as the result of comparison in step S301, all of the driving wheels of the towing vehicle are determined to be in a slip state as the result of determination in step S302, and the slip ratio $S_{MPV}$ of the wheel of the towed vehicle 200 is greater than the reference slip ratio $\lambda_{lim}$ as the result of comparison in step S303, control to solve slip of the towed vehicle and to escape the rough road is performed first to secure driving stability of the towed vehicle, and then control to solve slip of the towing vehicle and to escape the rough road is performed to secure driving stability of the towing vehicle.

To perform control to solve slip of the towed vehicle and to escape the rough road, the second controller 210 is configured to determine whether all of the driving wheels of the towed vehicle are in a slip state (S304) or is configured to determine whether some of the driving wheels of the towed vehicle are in a slip state (S305).

For example, when both wheel speed $V_{W\_L}$ of the left wheel of the towed vehicle and wheel speed $V_{W\_R}$ of the right wheel of the towed vehicle are greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that all of the driving wheels of the towed vehicle are in a slip state.

In contrast, when wheel speed $V_{W\_L}$ of the left wheel of the towed vehicle or wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that some of the driving wheels of the towed vehicle are in a slip state.

Subsequently, upon determining in step S304 that all of the driving wheels of the towed vehicle are in a slip state or upon determining in step S305 that some of the driving wheels of the towed vehicle are in a slip state, control is performed to limit left and right wheel driving forces of the towed vehicle to primarily avoid slip of the towed vehicle (S306).

Control to limit left and right wheel driving forces of the towed vehicle may be implemented by control to decrease left and right wheel driving forces of the towed vehicle to primarily solve slip of all or some of the driving wheels of the towed vehicle.

For example, the motor torque control unit 210-2 of the second controller 210 may perform control so that driving force (driving torque) of the left in-wheel motor 220-1 mounted to the left wheel of the towed vehicle 200 and driving force (driving torque) of the right in-wheel motor 220-2 mounted to the right wheel of the towed vehicle 200 are simultaneously decreased, whereby both left and right wheel driving forces of the towed vehicle may be decreased.

At the present time, decreased values $T_{MPV\_NEW}$ of left and right wheel driving forces of the towed vehicle may be determined as the product of driving force $T_{MPV\_ORIGIN}$ of the towed vehicle before decrease, a first factor factor1 determined as vehicle speed $V_{main}$ of the towing vehicle 100, and a second factor factor2 determined as the slip ratio $S_{main}$ of the driving wheel of the towing vehicle 100, as represented by Mathematical Expression 7 above.

When all or some of the wheels (left and right wheels) of the towed vehicle slip, therefore, control may be performed to decrease both left and right wheel driving forces of the towed vehicle, whereby the towed vehicle may easily escape a rough road causing slip by the decreased wheel driving force of the towed vehicle, and therefore driving stability of the towed vehicle may be secured first.

Meanwhile, after all of the driving wheels of the towed vehicle are determined to be in a slip state in step S304 and control to limit left and right wheel driving forces of the towed vehicle is performed in step S306, ABS cooperation control may be further performed (S307).

ABS cooperation control may be performed as the result of the ABS control unit 210-3 of the second controller 210 applying braking force to the braking device 230 mounted to the left wheel and the right wheel of the towed vehicle 200 at a predetermined cycle.

When all of the driving wheels of the towed vehicle are in a slip state, therefore, the left and right wheel driving forces of the towed vehicle are further limited through ABS cooperation control in addition to decrease of wheel driving force of the towed vehicle, whereby the towed vehicle may easily escape a rough road causing slip, and therefore driving stability of the towed vehicle may be easily secured first.

After some of the driving wheels of the towed vehicle are determined to be in a slip state in step S305 and control to limit left and right wheel driving forces of the towed vehicle, i.e., to decrease left and right wheel driving forces of the towed vehicle, is performed in step S306, the second controller 210 is configured to determine whether the right wheel of the towed vehicle is in a slip state (S308) or is configured to determine whether the left wheel of the towed vehicle is in a slip state (S309).

For example, when wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the right wheel of the towed vehicle is in a slip state.

In contrast, when wheel speed $V_{W\_L}$ of the left wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the left wheel of the towed vehicle is in a slip state.

Upon determining in step S308 that the right wheel of the towed vehicle is in a slip state, the second controller 210 is configured to perform control to increase the driving force distribution ratio of the left in-wheel motor 220-1 of the towed vehicle to be greater than the driving force distribution ratio of the right in-wheel motor 220-2 of the towed vehicle and ABS cooperation control (S310).

At the present time, the increased driving force distribution ratio $D_{NEW}$ of the left in-wheel motor 220-1 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the right wheel of the towed vehicle 200, which is in a slip state, at a predetermined cycle.

When the right wheel of the towed vehicle is in a slip state, therefore, control to increase the driving force distribution ratio of the left wheel to be greater than the driving force distribution ratio of the right wheel is performed, and at a same time ABS cooperation control is performed for the right wheel, whereby the towed vehicle may easily escape a rough road causing slip, and therefore driving stability of the towed vehicle may be easily secured.

In contrast, upon determining in step S309 that the left wheel of the towed vehicle is in a slip state, the second controller 210 is configured to perform control to increase the driving force distribution ratio of the right in-wheel motor 220-2 of the towed vehicle to be greater than the driving force distribution ratio of the left in-wheel motor 220-1 of the towed vehicle and ABS cooperation control (S311).

At the present time, the increased driving force distribution ratio $D_{NEW}$ of the right in-wheel motor 220-2 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the left wheel of the towed vehicle 200, which is in a slip state, at a predetermined cycle.

When the left wheel of the towed vehicle is in a slip state, therefore, control to increase the driving force distribution ratio of the right wheel to be greater than the driving force distribution ratio of the left wheel is performed, and at a same time ABS cooperation control is performed for the left wheel, whereby the towed vehicle may easily escape a rough road causing slip, and therefore driving stability of the towed vehicle may be easily secured.

Meanwhile, after steps S308, S310, and S311 are performed, the second controller 210 compares the slip ratio $S_{MPV}$ of the wheel of the towed vehicle 200 with the reference slip ratio $\lambda_{lim}$ again (S312). When the slip ratio $S_{MPV}$ of the wheel of the towed vehicle 200 is equal to or less than the reference slip ratio $\lambda_{lim}$, the second controller 210 is configured to determine that the slip state of the towed vehicle has been solved and is configured to perform step S106 to perform control to solve slip of the towing vehicle and to escape the rough road.

Step S106 is performed by the second controller 210 to perform control to increase both left and right wheel driving forces of the towed vehicle when all of the driving wheels (left and right driving wheels) of the towing vehicle slip, as described above.

When all of the driving wheels (left and right driving wheels) of the towing vehicle slip, therefore, control may be performed to increase both left and right wheel driving forces of the towed vehicle, whereby the towing vehicle may easily escape a rough road causing slip by the increased wheel driving force of the towed vehicle, and therefore driving stability of the towing vehicle may be secured.

In the third exemplary embodiments of the present disclosure, as described above, when all of the driving wheels of the towing vehicle are in a slip state and all or some of the driving wheels of the towed vehicle are in a slip state, control to solve slip of the towed vehicle and to escape the rough road is performed first to secure driving stability of the towed vehicle, and then control to solve slip of the towing vehicle and to escape the rough road is performed to secure driving stability of the towing vehicle.

Fourth Exemplary Embodiments

Figure 6:
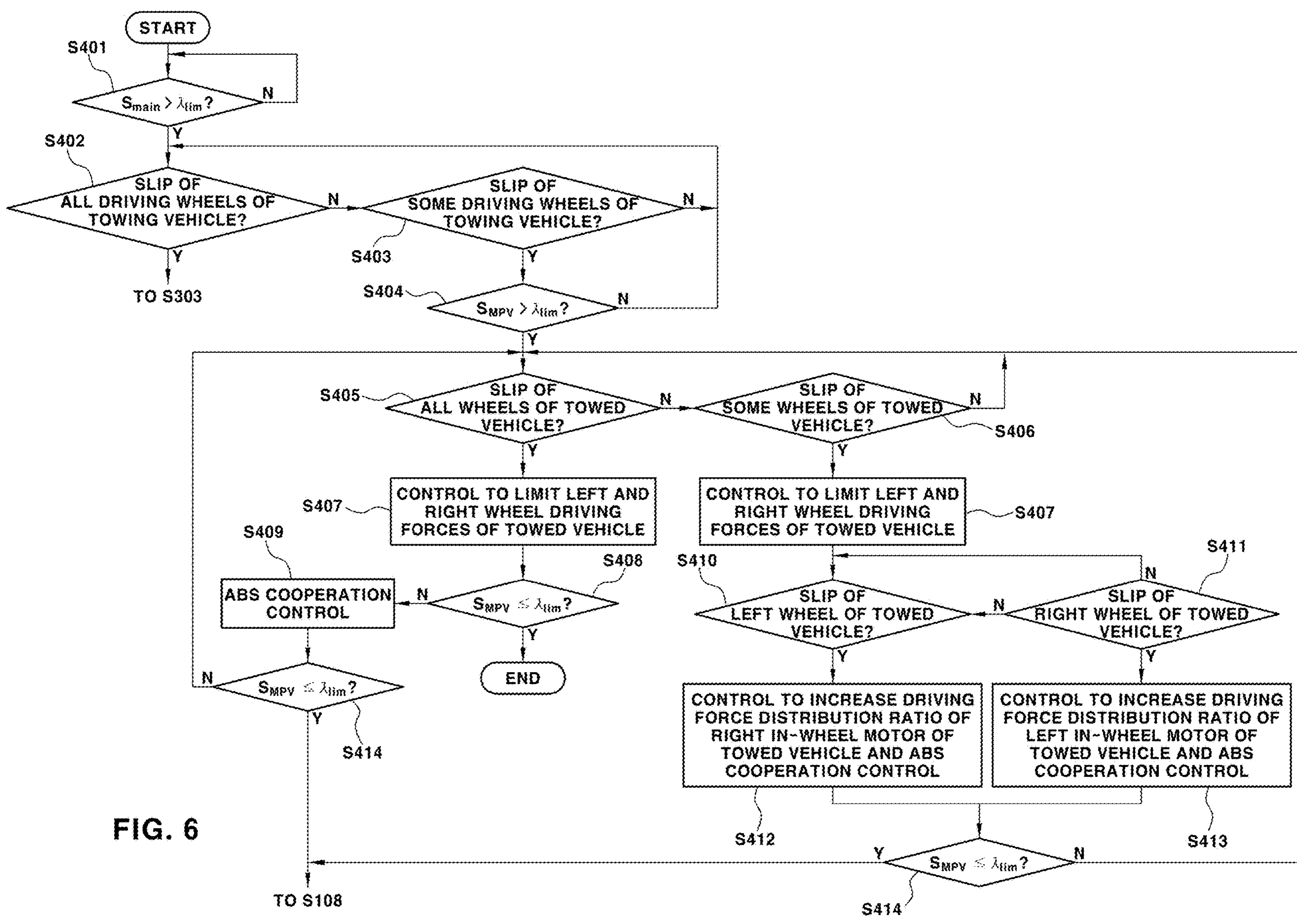
FIG. 6 is a flowchart showing a vehicle towing driving control method according to an exemplary embodiment of the present disclosure.

FIG. 6 is a flowchart showing a vehicle towing driving control method according to a fourth exemplary embodiments of the present disclosure.

The fourth exemplary embodiment of the present disclosure is characterized in that, if some of the driving wheels of the towing vehicle 100 are in a slip state and all or some of the driving wheels of the towed vehicle 200 are in a slip state when the towing vehicle 100 is driven while towing the towed vehicle 200 having driving force in the state in which the first controller 110 of the towing vehicle 100 and the second controller 210 of the towed vehicle 200 are communicatively connected to each other for driving data transmission, both the towing vehicle and the towed vehicle easily escape a rough road causing slip, and therefore driving stability is secured.

In other words, the fourth exemplary embodiment of the present disclosure is characterized in that, if some of the driving wheels of the towing vehicle 100 are in a slip state and all or some of the driving wheels of the towed vehicle 200 are in a slip state when the towing vehicle 100 is driven while towing the towed vehicle 200, control to solve slip of the towed vehicle and to escape the rough road is performed first to secure driving stability of the towed vehicle, and then control to solve slip of the towing vehicle and to escape the rough road is performed to secure driving stability of the towing vehicle.

To the present end, when the towing vehicle 100 is driven while towing the towed vehicle 200, first, the second controller 210 is configured to determine the slip ratio $S_{main}$ of the driving wheel of the towing vehicle 100 and compares the determined slip ratio with the reference slip ratio $\lambda_{lim}$ (S401), is configured to determine whether all of the driving wheels of the towing vehicle are in a slip state (S402), is configured to determine whether some of the driving wheels of the towing vehicle are in a slip state (S403), and is configured to determine the slip ratio $S_{MPV}$ of the wheel of the towed vehicle 200 and compares the determined slip ratio with the reference slip ratio $\lambda_{lim}$(S404).

For example, when wheel speed $V_{W\_L}$ of the left driving wheel of the towing vehicle or wheel speed $V_{W\_R}$ of the right driving wheel of the towing vehicle is greater than the product of the vehicle speed $V_{main}$ of the towing vehicle and (1+ reference slip ratio $\lambda_{lim}$), as represented by Mathematical Expression 3 above, based on the vehicle speed detected by the first vehicle speed sensor 111 and the wheel speed detected by the first wheel speed sensor 112, received from the first controller 110 through CAN communication, the slip determination unit 210-1 of the second controller 210 may be configured to determine that some of the driving wheels of the towing vehicle are in a slip state.

Upon determining that all of the driving wheels of the towing vehicle are in a slip state in step S402, step S303 of the fourth exemplary embodiment are performed.

When the slip ratio $S_{main}$ of the driving wheel of the towing vehicle 100 is greater than the reference slip ratio $\lambda_{lim}$ as the result of comparison in step S401, some of the driving wheels of the towing vehicle are determined to be in a slip state as the result of determination in step S403, and the slip ratio $S_{MPV}$ of the wheel of the towed vehicle 200 is greater than the reference slip ratio $\lambda_{lim}$ as the result of comparison in step S404, control to solve slip of the towed vehicle and to escape the rough road is performed first to secure driving stability of the towed vehicle, and then control to solve slip of the towing vehicle and to escape the rough road is performed to secure driving stability of the towing vehicle.

To perform control to solve slip of the towed vehicle and to escape the rough road, the second controller 210 is configured to determine whether all of the driving wheels of the towed vehicle are in a slip state (S405) or is configured to determine whether some of the driving wheels of the towed vehicle are in a slip state (S406).

For example, when both wheel speed $V_{W\_L}$ of the left wheel of the towed vehicle and wheel speed $V_{W\_R}$ of the right wheel of the towed vehicle are greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that all of the driving wheels of the towed vehicle are in a slip state.

In contrast, when wheel speed $V_{W\_L}$ of the left wheel of the towed vehicle or wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that some of the driving wheels of the towed vehicle are in a slip state.

Subsequently, upon determining in step S405 that all of the driving wheels of the towed vehicle are in a slip state or upon determining in step S406 that some of the driving wheels of the towed vehicle are in a slip state, control is performed to limit left and right wheel driving forces of the towed vehicle to primarily avoid slip of the towed vehicle (S407).

Control to limit left and right wheel driving forces of the towed vehicle may be implemented by control to decrease left and right wheel driving forces of the towed vehicle to primarily solve slip of all or some of the driving wheels of the towed vehicle.

For example, the motor torque control unit 210-2 of the second controller 210 may perform control so that driving force (driving torque) of the left in-wheel motor 220-1 mounted to the left wheel of the towed vehicle 200 and driving force (driving torque) of the right in-wheel motor 220-2 mounted to the right wheel of the towed vehicle 200 are simultaneously decreased, whereby both left and right wheel driving forces of the towed vehicle may be decreased.

At the present time, decreased values $T_{MPV\_NEW}$ of left and right wheel driving forces of the towed vehicle may be determined as the product of driving force $T_{MPV\_ORIGIN}$ of the towed vehicle before decrease, a first factor factor1 determined as vehicle speed $V_{main}$ of the towing vehicle 100, and a second factor factor2 determined as the slip ratio $S_{main}$ of the driving wheel of the towing vehicle 100, as represented by Mathematical Expression 7 above.

When all or some of the wheels (left and right wheels) of the towed vehicle slip, therefore, control may be performed to decrease both left and right wheel driving forces of the towed vehicle, whereby the towed vehicle may easily escape a rough road causing slip by the decreased wheel driving force of the towed vehicle, and therefore driving stability of the towed vehicle may be secured first.

Meanwhile, after all of the driving wheels of the towed vehicle are determined to be in a slip state in step S405 and control to limit left and right wheel driving forces of the towed vehicle is performed in step S407, the slip ratio $S_{MPV}$ of the wheel of the towed vehicle 200 is compared with the reference slip ratio $\lambda_{lim}$ again (S408). When the slip ratio $S_{MPV}$ of the wheel of the towed vehicle 200 is continuously greater than the reference slip ratio $\lambda_{lim}$, ABS cooperation control may be further performed (S409).

ABS cooperation control may be performed as the result of the ABS control unit 210-3 of the second controller 210 applying braking force to the braking device 230 mounted to the left wheel and the right wheel of the towed vehicle 200 at a predetermined cycle.

When all of the driving wheels of the towed vehicle are in a slip state, therefore, the left and right wheel driving forces of the towed vehicle are further limited through ABS cooperation control in addition to decrease of wheel driving force of the towed vehicle, whereby the towed vehicle may easily escape a rough road causing slip, and therefore driving stability of the towed vehicle may be more easily secured first.

After some of the driving wheels of the towed vehicle are determined to be in a slip state in step S406 and control to limit left and right wheel driving forces of the towed vehicle, i.e., to decrease left and right wheel driving forces of the towed vehicle, is performed in step S407, the second controller 210 is configured to determine whether the left wheel of the towed vehicle is in a slip state (S410) or is configured to determine whether the right driving wheel of the towing vehicle is in a slip state (S411).

For example, when wheel speed $V_{W\_L}$ of the left wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the left wheel of the towed vehicle is in a slip state.

In contrast, when wheel speed $V_{W\_R}$ of the right wheel of the towed vehicle is greater than the product of the vehicle speed $V_{MPV}$ of the towed vehicle and (1+ reference slip ratio $\lambda_{lim}$) based on the vehicle speed detected by the second vehicle speed sensor 211 and the wheel speed detected by the second wheel speed sensor 212, the slip determination unit 210-1 of the second controller 210 may be configured to determine that the right wheel of the towed vehicle is in a slip state.

Upon determining in step S410 that the left wheel of the towed vehicle is in a slip state, the second controller 210 is configured to perform control to increase the driving force distribution ratio of the right in-wheel motor 220-2 of the towed vehicle and ABS cooperation control (S412).

At the present time, the increased driving force distribution ratio $D_{NEW}$ of the right in-wheel motor 220-2 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the left wheel of the towed vehicle 200, which is in a slip state, at a predetermined cycle.

When the left wheel of the towed vehicle is in a slip state, therefore, control to increase the driving force distribution ratio of the right wheel to be greater than the driving force distribution ratio of the left wheel is performed, and at the same time ABS cooperation control is performed for the left wheel, whereby the towed vehicle may easily escape a rough road causing slip, and therefore driving stability of the towed vehicle may be easily secured.

In contrast, upon determining in step S411 that the right wheel of the towed vehicle is in a slip state, the second controller 210 is configured to perform control to increase the driving force distribution ratio of the left in-wheel motor 220-1 of the towed vehicle and ABS cooperation control (S413).

At the present time, the increased driving force distribution ratio $D_{NEW}$ of the left in-wheel motor 220-1 may be determined by multiplying the previous driving force distribution ratio $D_{ORIGIN}$ by the difference in absolute value between wheel speed $V_{W\_L}$ of the left wheel of the towed vehicle and wheel speed $V_{W\_R}$ of the right wheel of the towed vehicle.

Furthermore, ABS cooperation control may be performed as the result of the ABS control unit 210-3 of the second controller 210 applying braking force to the braking device 230 mounted to the right wheel of the towed vehicle 200, which is in a slip state, at a predetermined cycle.

When the right wheel of the towed vehicle is in a slip state, therefore, control to increase the driving force distribution ratio of the left wheel to be greater than the driving force distribution ratio of the right wheel is performed, and at the same time ABS cooperation control is performed for the right wheel, whereby the towed vehicle may easily escape a rough road causing slip, and therefore driving stability of the towed vehicle may be easily secured.

Meanwhile, after steps S409, S412, and S413 are performed, the second controller 210 compares the slip ratio $S_{MPV}$ of the wheel of the towed vehicle 200 with the reference slip ratio $\lambda_{lim}$ again (S414).

When the slip ratio $S_{MPV}$ of the wheel of the towed vehicle 200 is equal to or less than the reference slip ratio $\lambda_{lim}$, the second controller 210 is configured to determine that the slip state of the towed vehicle has been solved and is configured to perform steps S108 to S114 to perform control to solve slip of the towing vehicle and to escape the rough road.

Steps S108 to S114 are performed by the second controller 210 to perform control to increase left wheel driving force or right wheel driving force of the towed vehicle through control to increase the driving force distribution ratio of the left in-wheel motor of the towed vehicle to be greater than the driving force distribution ratio of the right in-wheel motor of the towed vehicle or to increase the driving force distribution ratio of the right in-wheel motor of the towed vehicle to be greater than the driving force distribution ratio of the left in-wheel motor of the towed vehicle when some of the driving wheels of the towing vehicle slip.

When some of the driving wheels of the towing vehicle slip, therefore, control may be performed to increase left wheel driving force or right wheel driving force of the towed vehicle through control to increase the driving force distribution ratio of the left in-wheel motor or the right in-wheel motor of the towed vehicle in steps S108 to S114, whereby the towing vehicle may easily escape a rough road causing slip by the increased wheel driving force of the towed vehicle, and therefore driving stability of the towing vehicle may be secured.

In the fourth exemplary embodiments of the present disclosure, as described above, when some of the driving wheels of the towing vehicle are in a slip state and all or some of the driving wheels of the towed vehicle are in a slip state, control to solve slip of the towed vehicle and to escape the rough road is performed first to secure driving stability of the towed vehicle, and then control to solve slip of the towing vehicle and to escape the rough road is performed to secure driving stability of the towing vehicle.

As is apparent from the foregoing, various aspects of the present disclosure are directed to providing the following effects.

First, if a wheel of a towing vehicle or a towed vehicle slips when the towing vehicle is driven while towing the towed vehicle having driving force, control to increase or decrease driving force of the towed vehicle may be performed, or control may be performed to change the driving force distribution ratio between left and right wheels of the towed vehicle, whereby it is possible to improve driving stability and rough road escape performance of the towing vehicle and the towed vehicle.

Second, when the wheel of the towed vehicle does not slip and only a driving wheel of the towing vehicle slips, control to increase driving force of the towed vehicle may be performed, or control may be performed to change the driving force distribution ratio between the left and right wheels of the towed vehicle, whereby the towing vehicle may easily escape a rough road causing slip, and therefore driving stability may be secured.

Third, when the driving wheel of the towing vehicle does not slip and only the wheel of the towed vehicle slips, control to limit (decrease) driving force of the towed vehicle may be performed, or control may be performed to change the driving force distribution ratio between the left and right wheels of the towed vehicle, whereby the towed vehicle may easily escape a rough road causing slip, and therefore driving stability may be secured.

Fourth, when all or some of the driving wheels of the towing vehicle are in a slip state and all or some of the wheels of the towed vehicle are in a slip state, both the towing vehicle and the towed vehicle may easily escape a rough road causing slip, and therefore driving stability may be secured.

The effects of the present disclosure are not limited to those mentioned above, and other unmentioned effects will be clearly understood by an ordinary skilled person from the above description.

Furthermore, the term related to a control device such as “controller”, “control apparatus”, “control unit”, “control device”, “control module”, or “server”, etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless particularly stated otherwise, a singular form may also include a plural form. The expression “at least one (or one or more) of A, B, and C” may include one or more of all combinations that may be made by combining A, B, and C.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A towing driving control method comprising:

exchanging driving data between a first controller of a towing vehicle and a second controller of a towed vehicle;

determining, by the second controller, slip of the towing vehicle and/or the towed vehicle; and when slip of at least one or more of driving wheels of the towing vehicle and/or at least one or more of driving wheels of the towed vehicle has occurred in the determining, by the second controller, of the slip of the towing vehicle and/or the towed vehicle, simultaneously or selectively adjusting a driving force of the at least one or more of the driving wheels of the towed vehicle, wherein the selectively adjusting of the driving force includes increasing a driving force distribution ratio of a non-slipping wheel and performing ABS control on a slipping wheel, and wherein a control to increase the driving force of the towed vehicle wheel is performed even when the wheel of the towed vehicle does not slip, if the driving wheel of the towing vehicle is determined to be in a slip state.

* * * * *